United States Patent
Uratani (10) Patent No.: US 9,573,304 B2
(45) Date of Patent: Feb. 21, 2017

(54) IN-MOLD DETACHABLE MARKING DEVICE

(71) Applicant: Uratanishouji Kabushiki Kaisha, Osaka-shi, Osaka (JP)

(72) Inventor: Hideki Uratani, Osaka (JP)

(73) Assignee: Uratanishouji Kabushiki Kaisha (JP)

( * ) Notice: Subject to any disclaimer, the term of this patent is extended or adjusted under 35 U.S.C. 154(b) by 0 days.

(21) Appl. No.: 14/368,859

(22) PCT Filed: Mar. 6, 2014

(86) PCT No.: PCT/JP2014/055869
§ 371 (c)(1),
(2) Date: Jun. 26, 2014

(87) PCT Pub. No.: WO2015/064120
PCT Pub. Date: May 7, 2015

(65) Prior Publication Data
US 2016/0250790 A1  Sep. 1, 2016

(30) Foreign Application Priority Data

Oct. 31, 2013  (JP) ................................. 2013-227773

(51) Int. Cl.
*B29C 45/37*  (2006.01)
*B29C 33/42*  (2006.01)

(52) U.S. Cl.
CPC .......... *B29C 45/374* (2013.01); *B29C 33/428* (2013.01)

(58) Field of Classification Search
CPC ..... B29C 45/374; B29C 33/428; B29C 33/42; B29C 39/22; B29C 39/26; B29C 33/76;
(Continued)

(56) References Cited

U.S. PATENT DOCUMENTS 5,788,872 A * 8/1998 Uratani ................ B29C 33/428
249/103
6,755,386 B2 * 6/2004 Navarra Pruna ..... B29C 33/428
249/103

(Continued)

FOREIGN PATENT DOCUMENTS

| JP | 3470880 | 11/2003 |
|---|---|---|
| JP | 2005254645 | 9/2005 |
| JP | 2010158714 | 7/2010 |

OTHER PUBLICATIONS

International Search Report, PCT/JP2014/055869 date of mailing Apr. 1, 2014.

*Primary Examiner* — Matthew Daniels
*Assistant Examiner* — Leith S Shafi
(74) *Attorney, Agent, or Firm* — Andrus Intellectual Property Law, LLP (57) ABSTRACT

The present invention provides an in-mold detachable marking device which does not lock rotation of an index body even when the index body is repeatedly rotated to switch marking indications. An in-mold detachable marking device comprises a substantially cylindrical outer shell body for indication fit into a molding mold, an index body fit into the outer shell body for indication and configured to be angularly displaceable around the axis line of the outer shell body for indication, a cover body screwed at the lowermost part of the outer shell body for indication, and a spring which biases the index body with the downward force, said outer shell body for indication and said index body having a marking indication part formed on their surfaces, wherein the index body comprises an index part facing inner surface of the mold, a positioning part extending downward from the index part, and a shaft extending downward from the positioning part, the shaft having a threaded part in its lower part, the spring has an engaging part which engages with the (Continued)

index part, and a fixed part which is fixed to the cover body, pitch of the spring of the engaging part and pitch of the threaded part are equal, and the engaging part and the threaded part engage each other.

5 Claims, 9 Drawing Sheets

(58) Field of Classification Search
CPC .......... B29C 33/00; A23G 1/20; B28B 17/00; B44B 5/02; B44B 5/026
USPC ........ 249/103, 104; 411/262, 289, 299, 318, 411/341–343, 347, 552, 438, 929.1, 946, 411/982; 267/264, 278; 403/109.3, 403/109.4, 146, 166, 229, 359.4
See application file for complete search history.

(56) References Cited

U.S. PATENT DOCUMENTS

| | | | |
|---|---|---|---|
| 2002/0179810 A1 | 12/2002 | Pruna | |
| 2009/0097940 A1* | 4/2009 | Campau | ........... F16B 37/12 |
| | | | 411/262 |
| 2009/0188399 A1* | 7/2009 | Uratani | ........... B29C 33/424 |
| | | | 101/28 |

* cited by examiner

IN-MOLD DETACHABLE MARKING DEVICE

CROSS REFERENCE TO RELATED APPLICATION

The present application is the U.S. national stage application of International Application PCT/JP2014/055869, filed Mar. 6, 2014. The International Application claims priority of Japanese Patent Application 2013-227773, filed Oct. 31, 2013.

TECHNICAL FIELD

The present invention relates to a marking device for performing marking on surfaces of a molding when a mold is formed, specifically, relates to an in-mold detachable marking device which does not lock rotation of an index body even when the index body is repeatedly rotated to switch marking indications.

BACKGROUND

A molding is generally provided with date of manufacture, lot number, product number, etc. on its surface and these indications are used for investigating, the causes leading to defects in the molding and for performing inventory control. An indication body comprising a marking indication part is attachably and detachably inserted into inner surface of a molding mold and then the molding is molded with the indication body inserted therein. As a result, these indications, including the marking contents of the indication body in its entirety, are marked and molded on the surface of the molding.

Japanese Patent Publication No. 3470880 discloses a marking device comprising such an indication body. The marking device disclosed by the Patent Publication No. 3470880 is shown in FIG. 10.

Figure 10:
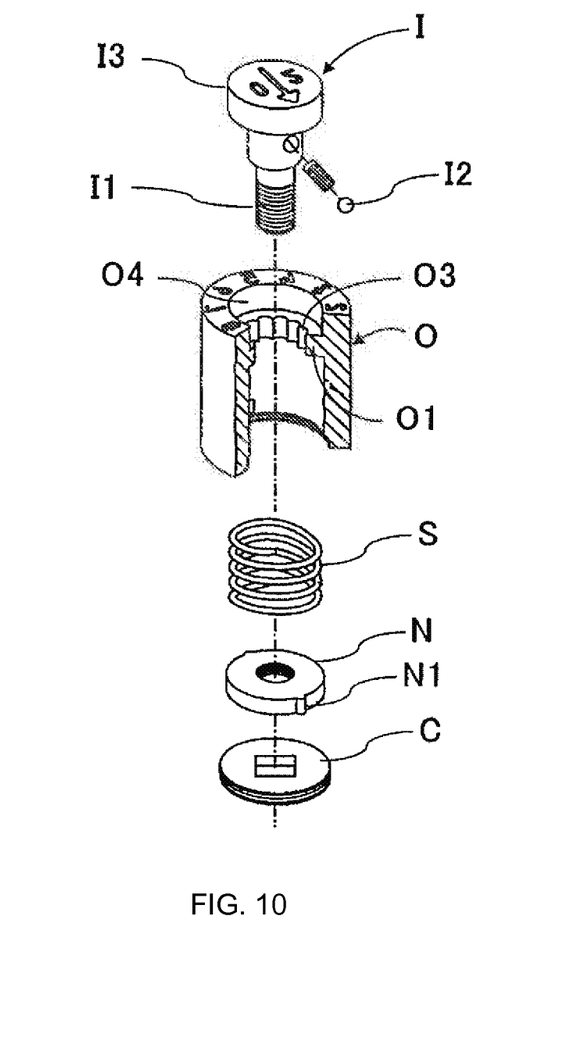
FIG. 10 shows a conventional marking device.

As shown in FIG. 10, the marking device disclosed by the Patent Publication No. 3470880 consists of a substantially cylindrical outer shell body (O) on which surface indications are marked, a substantially bolt-shaped index body (I), a spring (S), a nut (N), and a cover body (C).

The index body (I) is fit into the outer shell (O) from upper side of the outer shell (O). The nut (N) is placed from lower side to the inside of the outer shell body (O) and is threadedly engaged with a threaded part (I1) formed in a lower part of the index both (I). The spring (S) is arranged between the nut (N) and a projecting step part (O1) formed at intermediate position in an axial direction of the inner wall of the outer shell body (O), and downwardly biases the nut (N) with the force and the index body (I) connected with the nut (N). The cover body (C) is threadedly engaged with female thread parts formed in the lower part of the inner wall of the outer shell body (O), and blocks a lower opening of the outer shell body (O).

At the intermediate position of the index body (I), the projecting part (I2) consisting of a spring and a sphere projects in a radial direction of the index body (I). Moreover, the projecting step part (O1) of the outer shell body (O) has a plurality of positioning grooves (O3) formed continuously and at equal intervals in a circumferential direction, into which the projecting part (I2) is fit.

The marking device disclosed by the Patent Publication No. 3470880 has a structure such that if the index body (I) rotates, the projecting part (I2) projecting from the index body (I) is fit into the positioning grooves (O3), leading to secure fixation of angular positions of the index body at a desired position.

According to the marking device disclosed by the Patent Publication No. 3470880, when the nut (N) is threadedly engaged with the threaded part (I1) of the index body (I), an engaging projection (N1) formed on outer surface of the nut (N) and the outer shell body (O) engage each other. This engagement prevents the nut (N) from rotating when the index body (I) rotates, and the nut (N) moves only in upper direction of the axis of the outer shell body (O). If the index body (I) repeatedly keeps rotating in accordance with the use of the marking device, however, the nut (N) comes into contact with the projecting step part (O1) and is then locked, which prevents the nut (N) from moving in upper direction of the outer shell body (O) axis. As a result, the index body (I) can no longer rotate. In order to rotates the index body (I) again, it is necessary to move the nut (N) to the lower part of the threaded part (I1). Therefore, it was required to remove the marking device from the mold once, remove the index body (I) from the marking device, move the nut (N) to the lower part of the index body (I), mount the index body (I) to the marking device, and then mount the marking device to the mold. Furthermore, molding of a resin by heating and melting the resin may produce gas from the melted resin. In a conventional marking device, the gas produced from the melted resin enters the inside of the marking device through the space between the upper part (index part) of the index body and the inner wall surface of the outer shell body (O), and solidifies in the gap between the threaded part (I1) of the index body and the nut (N). This can prevent the index body (I) from rotating. In such a case, it was necessary to remove the solidified product (residue) by using a solvent etc., which was troublesome.

Furthermore, in order to remove the marking device from the mold for maintenance, the marking, device is removed by being hit with a hammer etc. through a hole provided to face a surface opposite from the surface the marking device is attached on. However, it may be difficult to hit with a hammer etc. and remove the marking device due to positional relationship of pipes such as a cooling path provided in the mold. In this case, a stick etc. is welded, on top surface of the index body 1 and pulled, so that the marking, device is pulled out of and removed from the mold. This detaching work is troublesome and time-consuming, and therefore, the maintenance work was inefficient.

SUMMARY OF THE INVENTION

The present invention is made to solve the problems above and provides an in-mold detachable marking device which does not lock rotation of an index body even when the index body is repeatedly rotated to switch marking indications, is able to prevent the index body from stopping rotating due to solidification of the gas produced from the melted resin in the marking device, and is also easy to be removed from a mold.

The invention according to first aspect relates to an in-mold detachable marking device comprising a substantially cylindrical outer shell body for indication fit into a molding mold, an index body fit into the outer shell body for indication and configured to be angularly displaceable around the axis line of the outer shell body for indication, a cover body screwed at the lowermost part of the outer shell body for indication, and a spring which biases the index body with the downward force, said outer shell body for indication and said index body having a marking indication part formed on their surfaces, wherein the index body comprises an index part facing inner surface of the mold, a positioning part extending downward from the index part, and a shaft extending downward from the positioning part, the shaft having a threaded part in its lower part, the spring has an engaging part which engages with the threaded part of the index body, and a fixed part which is fixed to the cover body, pitch of the spring of the engaging part and pitch of the threaded part are equal, and the engaging part and the threaded part engage each other.

The invention according to second aspect relates to the in-mold detachable marking device of the first aspect, the marking device comprising at inner wall of the outer shell body for indication, an upper part receiving the index part, a middle part locating below the upper part, where the positioning part is located, and a lower part locating below the middle part and receiving the shaft, the lowermost part of the outer shell body for indication is located below the lower part, has a larger diameter than the lower part, and comprises a female thread part which the cover body is screwed with, the cover body has a groove portion, the fixed part of the spring is arranged at the groove portion, and the top surface of the cover body and the lower part of the outer shell body for indication come into contact.

The invention according to third aspect relates to the in-mold detachable marking device of the first or second aspect, the marking device comprising at the positioning part of the index body, a projecting part for positioning which projects in a radial direction of the positioning part, the projecting part for positioning consists of a positioning spring embedded in the positioning part and a fitting part placed at a tip of the positioning spring, the projecting part tot positioning is fit into the middle part of the inner wall surface of the outer shell body for indication and positioning grooves extending in an axial direction of the outer shell body for indication are formed continuously and at equal intervals along a circumferential direction of the outer shell body for indication.

The invention according to fourth aspect relates to the in-mold detachable marking device of any of the first to third aspect, the cover body is a substantially cylindrical shaped in a planar view and has a female thread part on the inner peripheral surface of the cylindrical shape.

According to the present invention of the first aspect, an in-mold detachable marking device comprises a substantially cylindrical outer shell body for indication fit into a molding mold, an index body fit into the outer shell body for indication and configured to be angularly displaceable around the axis line of the outer shell body for indication, a cover body screwed at the lowermost part of the outer shell body for indication, and a spring which biases the index body with the downward force, said outer shell body for indication and said index body having a marking indication part formed on their surfaces, wherein the index body comprises an index part facing inner surface of the mold, a positioning part extending downward from the index part, and a shaft extending downward from the positioning part, the shaft having a threaded part in its lower part, the spring has an engaging part which engages with the index body, and a fixed part which is fixed to the cover body, pitch of the spring of the engaging, part and pitch of the threaded part are equal, and the engaging part and the threaded part engage each other. Therefore, the spring can not only bias the index body downwardly but also rotatably fix the index body. That is, the spring can also serve as a nut for rotatably fixing the index body provided in a conventional marking device. This makes the nut unnecessary and allows the index body to repeatedly rotate without being blocked due to prevention of the nut movement (lifting). Moreover, the number of components of the marking device can be reduced due to the lack of the need for nuts.

Furthermore, an area where the threaded part of the index body and the spring come into contact is smaller, compared to an area where the threaded part of the index body and the nut of the conventional marking device come into contact. Therefore, even when gas produced from the melted resin during molding enter the marking device and solidifies inside the marking device, solidified product (residue) will not prevent the index body from rotating.

According to the present invention of the second aspect, the in-mold detachable marking device comprises at inner wall of the outer shell body for indication, an upper part receiving the index part, a middle part locating below the upper part, where the positioning part is located, and a lower part locating below the middle part and receiving the shaft, the lowermost part of the outer shell body for indication is located below the lower part and has a larger diameter than the lower part, the cover body has a groove portion, the fixed part of the spring is arranged at the groove portion, and the top surface of the cover body and the lower part of the outer shell body for indication come into contact. Accordingly, the fixed part of the spring is fixed to the groove portion of the cover body. Therefore, the spring extends upwardly as its engaging part moves up along the threaded part due to the rotation of the index body. When the engagement between the engaging part and the threaded part is disengaged, the spring contracts downwardly and the engaging part engages with the threaded part again. Therefore, it is possible to keep using the marking device, without locking the rotation of the index body, even if the index body is repeatedly rotated.

According to the present invention of the third aspect, the in-mold detachable marking device comprises at the positioning part of the index body, a projecting part for positioning which projects in a radial direction of the positioning part, the projecting part for positioning consists of a positioning spring embedded in the positioning part and a fitting part placed at a tip of the positioning spring, the projecting part for positioning is fit into the inner wall of the outer shell body for indication and the positioning grooves extending in an axial direction of the outer shell body for indication are formed continuously and at equal intervals along a circumferential direction of the outer shell body for indication. Accordingly, this results in secure fixation of angular positions of the index body at a desired position.

According to the present invention of the fourth, the cover body is a substantially cylindrical shaped in a planar view and has a female thread part on the inner peripheral surface of the cylinder. Even in a case where a hammer cannot be used for removing the marking device from a mold due to structural problems of the mold, this allows for the marking device to be easily removed from the mold by threadedly engaging the female thread part with the male thread part of a screwdriver etc. and then pulling the marking device out of the mold. This improves efficiency a maintenance operation.

DETAILED DESCRIPTION OF THE PREFERRED EMBODIMENTS

Figure 1:
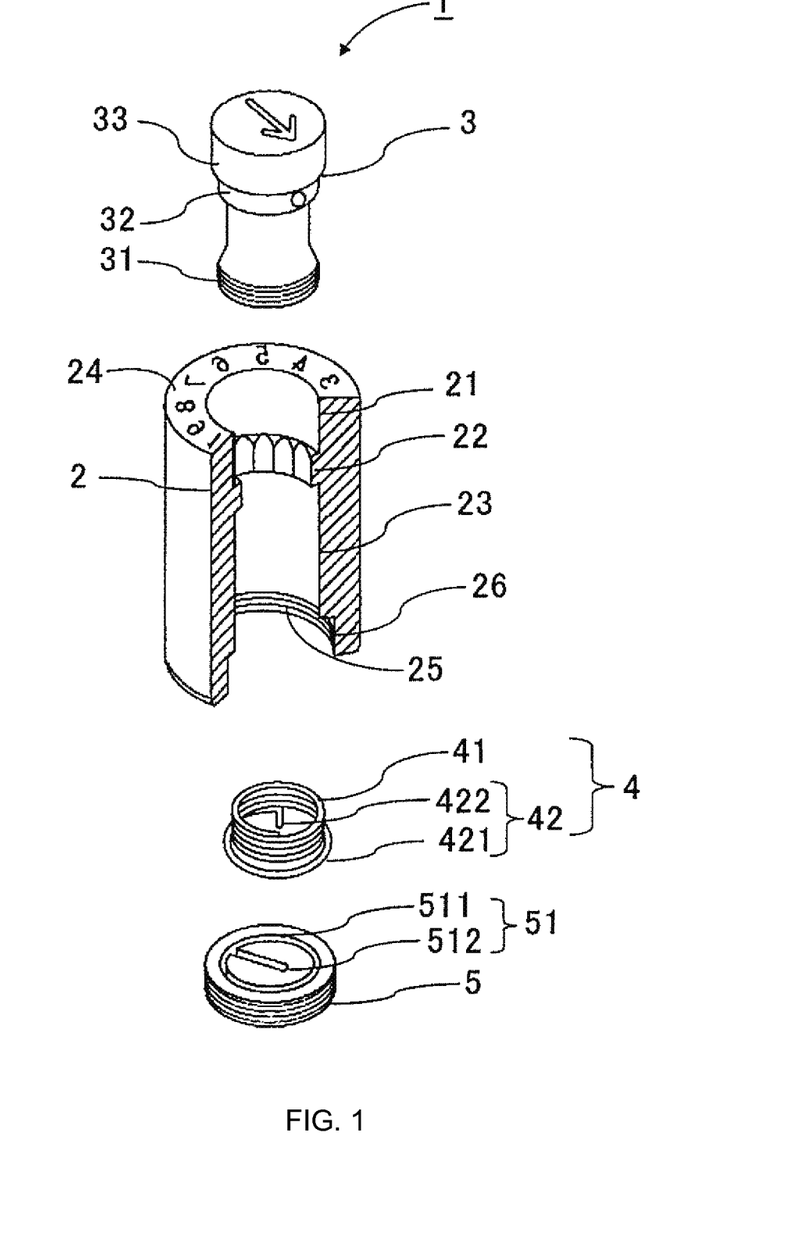
FIG. 1 is an exploded perspective view showing a marking device according to the present invention.
Figure 2A:
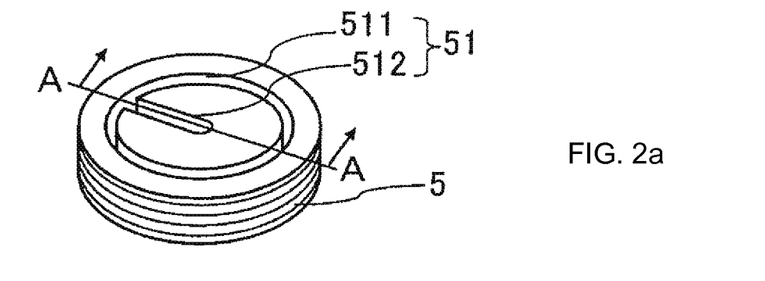
FIG. 2 shows a cover body of the marking device according to the present invention, and (a) shows a case where a linear part of the cover body is arranged on top surface of a cover part, (b) shows a cross sectional view along A-A line of (a), (c) shows a case where the linear part of the cover body is arranged to extend below an annular part of the cover part, and (d) shows a cross sectional view along A-A line of (c).
Figure 2B:
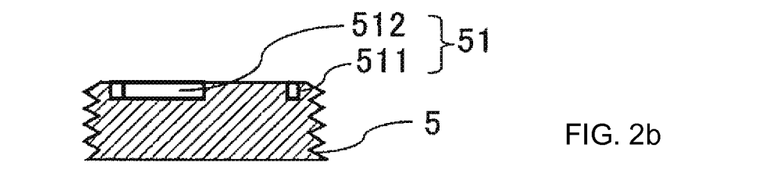
Figure 2C:
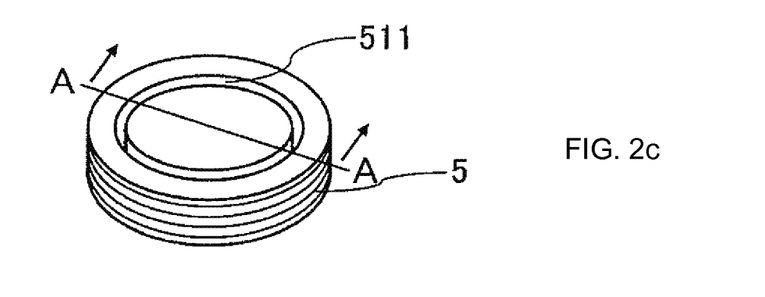
Figure 2D:
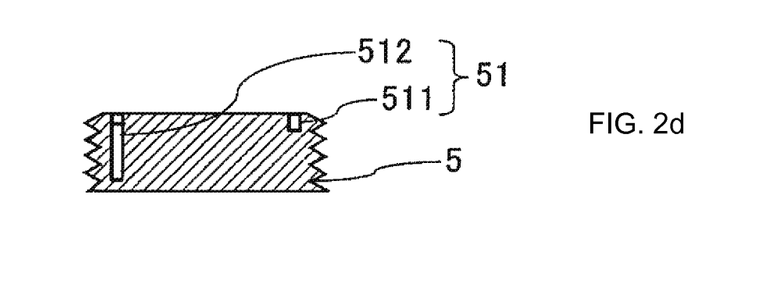

Hereinafter, embodiments of an in-mold detachable marking device according to the present invention will be set forth with reference to the drawings. FIG. 1 is an exploded perspective view showing the in-mold detachable marking device according to the present invention.

The in-mold detachable marking device according to the present invention 1 (hereinafter, referred to as the marking device 1 comprises a substantially cylindrical outer shell body for indication 2, an index body 3 fit into the outer shell body for indication 2 from above and configured to be angularly displaceable around the axis line of the outer shell body for indication, a cover body 5 screwed at the lowermost part 26 of the outer shell body for indication 2, and a spring 4 which biases the index body 3 with the downward force.

Inner wall surface of the outer shell body for indication 2 is divided into three regions; an upper part 21 receiving the index part 3, a middle part 22 locating below the upper part 21, where a positioning part 32 is located, and a lower part 23 locating below the middle part 22 and receiving a shaft 31. The upper part 21 has a larger diameter than the middle part 22, and the lower part 23 has a larger diameter than the middle part 22.

The lowermost part 26 is located below the lower part 23 of the outer shell body for indication 2. Female thread parts are formed the inside of the lowermost part 26 and the cover body 5 is threadedly engaged with the female thread parts 25. A groove portion 51 is formed on the cover body 5 and consists of an annular part 511 and a linear part 512, as shown in FIG. 1.

The spring 4 which biases the index body 3 with the downward force consists of an engaging part 41 and a fixed part 42 which are continuously and integrally formed. The fixed part 42 has a larger diameter than an engaging part 41. The pitch of the spring of the engaging part 41 is equal to the pitch of the threaded part 311 of the index body 3. This allows the engaging part 41 of the spring 4 and the threaded part 311 of the index body 3 to engage each other (see FIG. 5 (*a*)). The fixed part 42 is located at a lower part of the spring 4 (below the engaging part 41) and has an annular part 421 and a linear part 422.

FIG. 2 shows a cover body 5 of the marking device 1 according to the present invention, and (a) shows a case where a linear part of the cover body is arranged on top surface of a cover part, (b) shows a cross sectional view along A-A line of (a), (c) shows a case where the linear part of the cover body is arranged to extend below an annular part of the cover part, and (d) shows a cross sectional view along A-A line of (c).

The linear part 512 of the groove portion 51 is arranged on top surface of the cover body 5, as shown in FIGS. 2 (*a*) and (*b*), while it may be arranged to extend downward from the annular part 511, as shown in FIGS. 2 (*c*) and (*d*).

The annular part 421 is arranged in the annular part 511 of the cover body 5, and the linear part 422 is arranged in the linear part 512 of the groove portion 51 of the cover body 5. As a result, the fixed part 42 of the spring 4 is unrotatably fixed to the cover body 5.

Since the engaging part 41 engages with the threaded part 311 of the index body 3 while the fixed part 42 is fixed to cover body 5, the spring 4 can bias the index body 3 in a downward direction and fix the index body 3 rotatably.

As shown in FIGS. 2 (*c*) and (*d*), when the linear part 512 is provided to extend downward from the annular part 511, the linear part 422 of the fixed part 42 of the spring 4 is provided so as to project below the annular part 421, and is arranged in the linear part 512 of the groove portion 51.

Figure 3A:
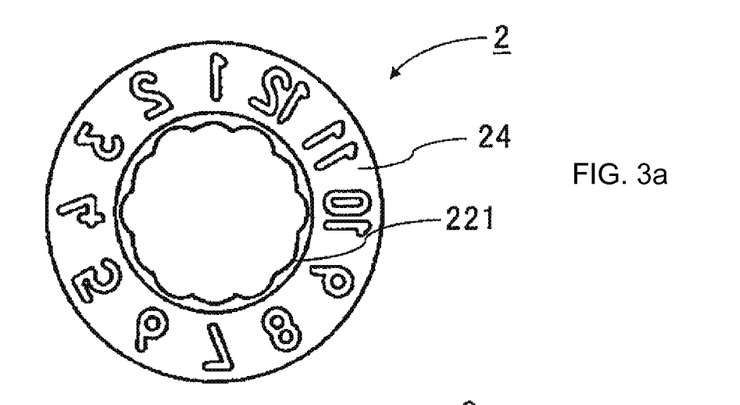
FIG. 3 shows outer shell body for indication according to the present invention. (a) is a plan view of the outer shell body for indication, (b) is a longitudinal sectional view of the outer shell body for indication, and (c) is a bottom view of the outer shell body for indication.
Figure 3B:
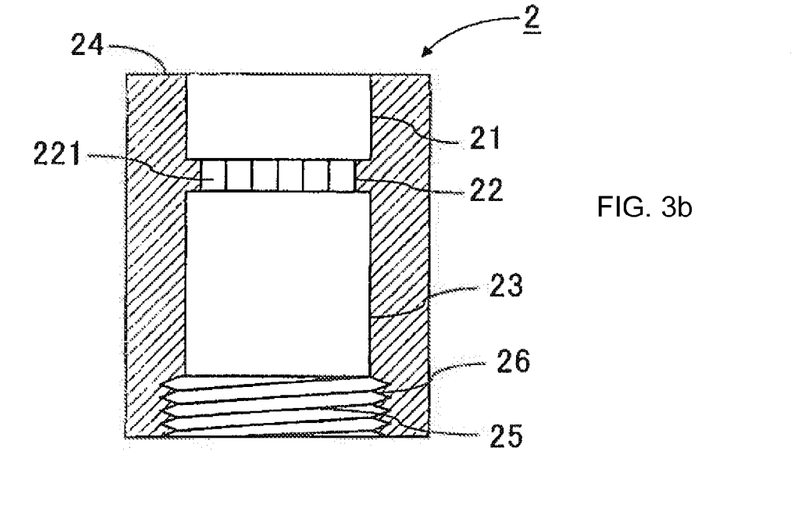
Figure 3C:
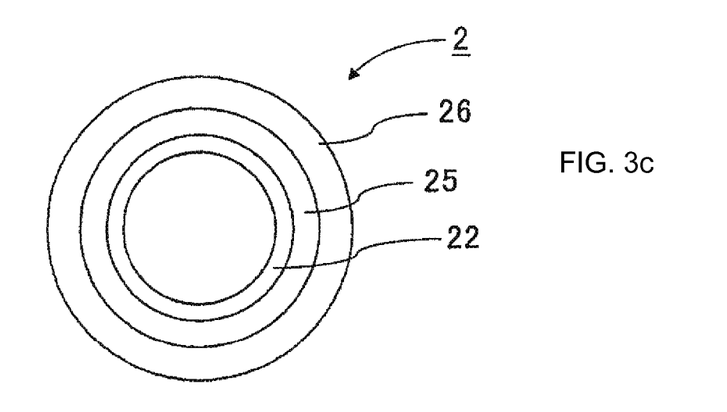

FIG. 3 shows the outer shell body for indication 2, (a) is a plan view of the outer shell body for indication 2, and (b) is a longitudinal cross sectional view of the outer shell body for indication 2, and (c) is a bottom view of the outer shell body for indication 2.

Characters are marked on the top surface of the outer shell body for indication 2 to form a marking indication part 24. When the outer shell body for indication 2 is fit into a molding mold, the marking indication part 24 is exposed inside the mold, and the characters of the marking indication part 24 are marked on a molding, in the example shown in the figure, numbers 1 to 12 indicating a month of manufacture are marked on the marking indication part 24. It is noted that in the present invention, the characters of the marking indication part 24 are not limited to these, but desired characters such as, for example, date of manufacture, lot number, and manufacturing line number may be marked.

As shown in FIG. 3, a plurality of positioning grooves 221 is formed in the middle part 22. The positioning grooves 221 extend in the axial direction of the outer shell body for indication 2. In addition, the positioning grooves 221 are arranged continuously and at equal intervals along the peripheral direction of the middle part 22. The number of the positioning grooves 221 is equal to the number of locations required for positioning.

Figure 4A:
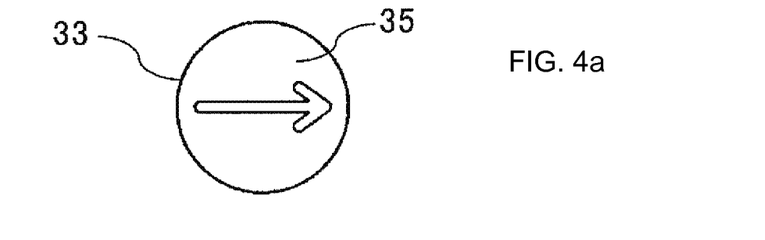
FIG. 4 shows an index body according to the present invention. (a) is a plan view of the index body and (b) is a front view of the index body.
Figure 4B:
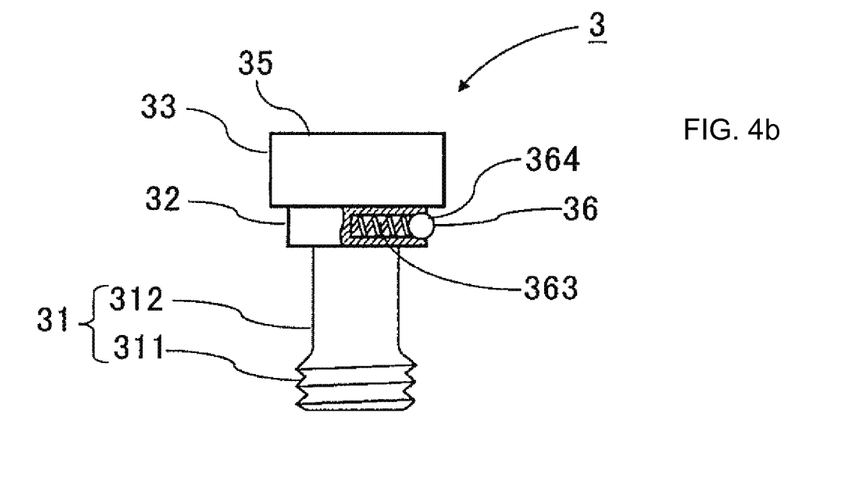

FIG. 4 shows the index body 3. FIG. 4 (*a*) is a drawing of the index body 3 viewed from the above (plan view), and FIG. 4 (*b*) is a drawing of the index body 3 viewed from the front (front view).

The index body 3 consists of three parts. An index part 33 is located at the uppermost part, the positioning part 32 downwardly extends from the bottom surface of the index part 33, and the shaft 31 is formed to further downwardly extend from the positioning part 32.

The index part 33 is received in the upper part 21 of the outer shell body for indication 2. The index part 33 is formed such that the height of the index part 33 is equal to the depth of the upper part 21. When the index body 3 is fit into the outer shell body for indication 2, the top surface of the index body 3 and the top surface of the outer shell body fear indication 2 are leveled with each other.

Characters are marked on the top surface of the index part 33 to form a marking indication part 35. When the marking device 1 is fit into a molding mold, the marking indication part 35 is exposed inside the mold, and the characters of the marking indication part 35 are marked on a molding.

In the example shown in FIG. 4(a), an arrow is marked on the marking indication part 35. It is noted that in the present invention, what is marked on the marking indication part 35 is not limited to this.

In the example shown in FIG. 4, a flat-blade screwdriver can be inserted in the arrow-mark place to rotate the index body 3. For example, when the arrow mark is aligned with character "3" marked on the marking indication part 24 of the outer shell body for indication 2 shown in FIG. 3, a mark indicating a molding manufactured in "March" can be applied to the molding.

When the index body 3 is fit into the outer shell body for indication 2, the positioning part 32 formed below the index part 33 is located inside the middle part 22 of the outer shell body for indication 2. The positioning part 32 is formed to have a diameter smaller than that of the index part 33, and the bottom surface of the index part 33 is in contact with the top surface of the middle part 22 of the outer shell body for indication 2. Therefore, due to this contact between the index part 33 and the middle part 22, the index part 33 does not move below the middle part 22 even if the index part 33 is biased in a downward direction by the spring. As a result, the top surface of the index part 33 of the index body 3 and the top surface of the outer shell body for indication 2 are leveled with each other.

On the positioning part 32 is provided a projecting part for positioning 36 which projects in the radial direction of the positioning part 32. The projecting part for positioning 36 consists of a positioning spring 363; and a fitting part 364 arranged at the tip of the positioning spring 363. The positioning spring 363 is embedded in a hole formed in the positioning part 32, and the fitting part 364 projects from the outer peripheral surface of the positioning part 32.

The fitting part 364 arranged at the tip of the projecting part for positioning 36 is formed preferably to have a spherical shape. When the fitting part 364 formed in this manner moves from a positioning groove 221 to an adjacent positioning groove 221, the fitting part 364 is not caught by an edge of the positioning groove 221, thereby preventing damage to the projecting parts for positioning 36.

Here, the wall surface of the positioning groove 221 is formed preferably to have a curved surface with a curvature radius substantially equal to the radius of the spherical fitting part 364. In this manner, the positioning groove 221 and the fitting part 364 are in a surface-contact with each other, thereby exerting a more accurate positioning function. More preferably, when the positioning groove 221 is formed to have a semi-circular shape in a cross sectional view, a contacting area of the positioning groove 221 with the fitting part 364 can be maximized, thereby exerting a further accurate positioning function.

Figure 5A:
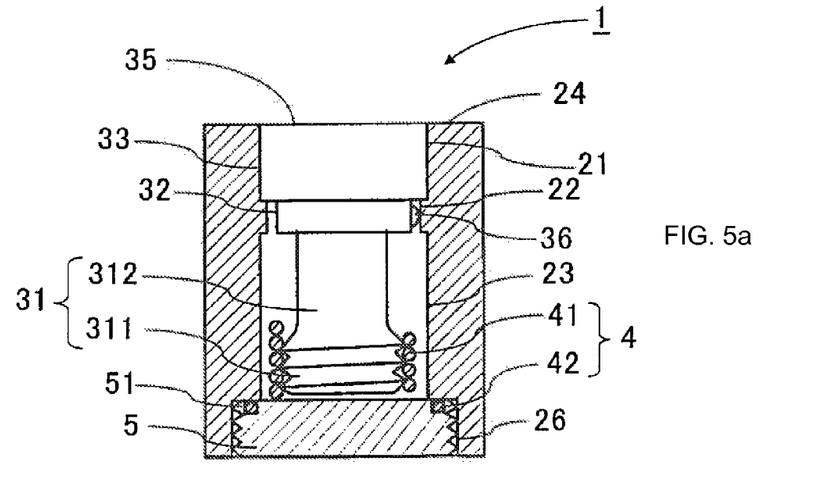
FIG. 5 shows a marking device according to the present invention. (a) is a longitudinal sectional view of the marking device, and (b) is a longitudinal sectional view of the marking device with the index body rotated.

A shaft 31 is formed below the positioning part 32 and has a threaded part 311 at its lower part. The pitch of the threaded part 311 is equal to the pitch of the spring 4. The depth of the threaded part 311 is substantially equal to the diameter of the spring 4. Therefore, the threaded part 311 and the spring 4 engage each other (see FIG. 5(a)) to rotatably fix the index body 3. Above the threaded part 311 is provided a non-threaded part 312, the wire diameter of which is smaller than that of the threaded part 311.

FIG. 5 is an assembly drawing of a marking device according to the present invention.

As shown in FIG. 5, the index body 3 is fit into the outer shell body for indication 2 from the upper side of the outer shell body for indication 2. The index part 33 of the index body 3 is received in the upper part 21 of the outer shell body for indication 2. Here, the top surface of the index part 33 and the top surface of the outer shell body for indication 2 are leveled with each other. Thus, it is possible to make a mark on a molding without generating a difference in level between the marking indication parts 35 and 24 formed on the top surface of the index part 33 and formed on the top surface of the outer shell body for indication 2, respectively.

The positioning part 32 of the index body 3 is located in the middle part 22 of the outer shell body for indication 2. The projecting parts for positioning 36 arranged at the positioning parts 32 and the positioning grooves 221 formed at the middle part 22 allow an accurate positioning of the index body 3.

At the lower part 23 of the outer shell body for indication 2, the engaging part 41 of the spring 4 engage with the threaded part 311 of the index body 3, and at the lowermost part 26, the fixed part 42 of the spring 4 is fixed to the cover body 5, so that the index body 3 can be rotatably fixed. Since the spring 4 biases the index body 3 with a downward force, the top surface of the index body 3 and the top surface of the outer shell body for indication 2 are always leveled with each other.

As shown in FIG. 5, since the diameter of the lowermost part 26 of the outer shell body for indication 2 is larger than that of the lower part 23, a part of the top surface of the cover body 5 (a portion near the outer periphery) and the lower part 23 are in contact with each other when the cover body 5 is screwed with a female thread part 52 and is attached to the lowermost part 26. As shown in FIG. 5, the annular part 511 of the groove portion 51 in which the annular part 421 of the spring 4 is arranged is formed at the upper part of the cover body 5 (a portion near the outer periphery) which is in contact with the lower part 23. Therefore, when the index body 3 rotates, the engaging part 41 of the spring 4 moves in the upward direction of the shaft 31; however, the fixed part 42 cannot move upward since it is blocked by the lower part 23 of the outer shell body for indication 2. When the index body 3 rotates, the spring 4 expands in the upward direction of the shaft 31.

Figure 5B:
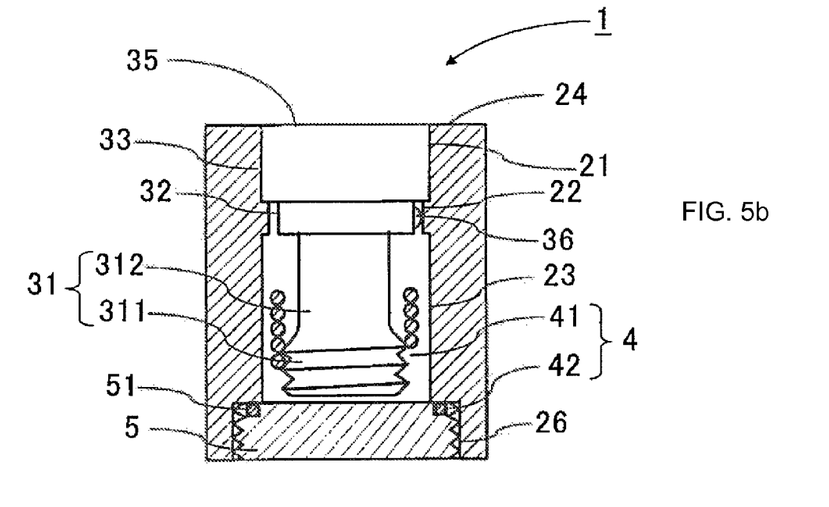

The operation of the index body 3 and the spring 4 in use of the marking device 1 will be described. Since the pitch of the engaging part 41 of the spring 4 is equal to the pitch of the threaded part 311 of the index body 3, the engaging part 41 and the threaded part 311 are engaged with each other in the initial state (see FIG. 5(a)). When the index body 3 rotates clockwise, the spring 4 expands since the engaging part 41 moves upward along the threaded part 311. When the index body 3 further rotates, the engaging part 41 further moves upward; however, the spring 4 and the shaft 31 of the index body 3 cannot engage with each other since the upper part of the shaft 31 is the non-threaded part 312, on which no screw thread is formed (see FIG. 5(b)). As a result, the spring 4 contracts, and accordingly the engaging part 41 moves downward and engages with the threaded part 311 again (see FIG. 5(a)).

When the index body 3 repeatedly rotates, the states of FIGS. 5(a) and 5(b) are repeated due to the expansion/contraction operation of the spring 4 described above. Therefore, it is possible to continuously use the marking device. 1 without locking of the index body 3, which occurs in the conventional device.

As described above, in the present invention, since the spring 4 includes the engaging part 41 and the fixed part 42, it is possible to rotatably fix the index body 3 and bias it in the downward direction. Thus, a nut for fixing the index body 3 is not required unlike the conventional device in which a nut is required. As a result, the number of components of the marking device 1 can be reduced, and no work for removing the marking device from a molding mold is required since the index body 3 does not lock, thereby improving the efficiency of molding operation.

Further, when a resin is heated and melted at the time of molding, gas generated from the melted resin may enter the inside of the marking device 1 through the space between the outer peripheral surface of the index part 33 of the index body 3 and the inner wall surface of the outer shell body 2 and solidifies there. However, the rotation of the index body 3 is not disturbed by bonding of the threaded part 311 of the index body 3 with the spring 4 with the solidified product (residue) since the contacting area of the threaded part 311 with the spring 4 is small.

Figure 6:
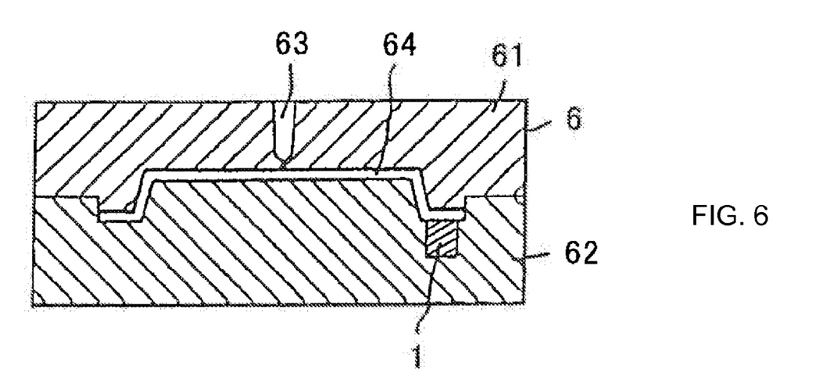
FIG. 6 is a cross sectional view showing that the marking device according to the present invention is mounted in the mold.

FIG. 6 is a cross sectional view showing a state in which the marking device 1 is mounted in a mold. A molding mold 6 consists of a fixed mold 61 having an injection port 63; and a movable mold 62 which contacts with and separates from the fixed mold 61, wherein a cavity 64 is formed between the fixed mold 61 and the movable mold 62. The marking device 1 is mounted in the movable mold 62 so as to face the cavity 64.

Hereinafter, a second embodiment of the present invention will be described. Only the different parts from the above-described embodiment (first embodiment) will be described, and the description of the same configuration as that of the first embodiment will be omitted by allocating the same reference numerals.

Figure 7:
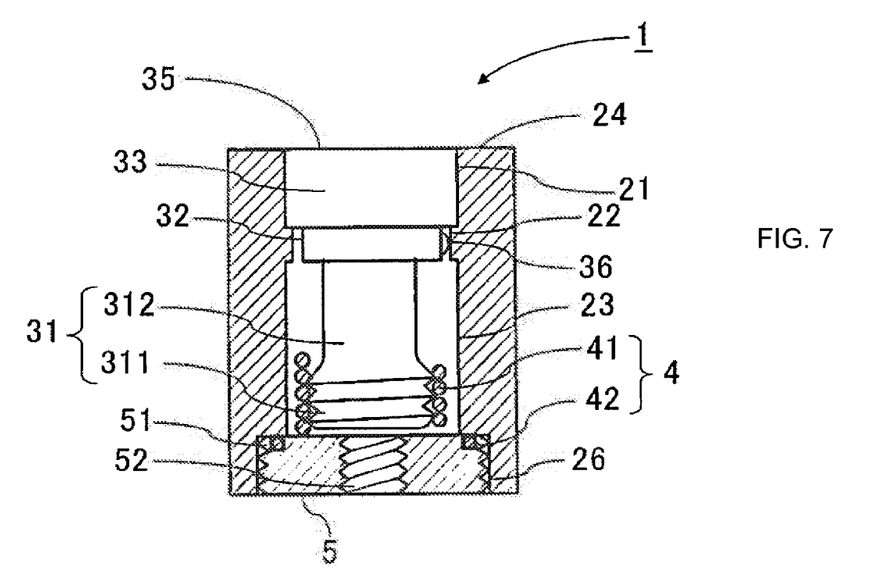
FIG. 7 shows a marking device of the second embodiment of the present invention.
Figure 8A:
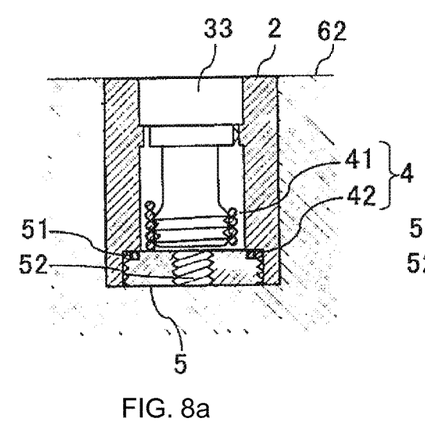
FIG. 8 shows a process of removing the marking device from the mold, and (a) shows the marking device attached to the mold, (b) shows the marking device with the index body removed, and (c) shows the marking device with a tool screwed with the cover body, and (d) shows that the marking device is being pulled out of the mold.
Figure 8B:
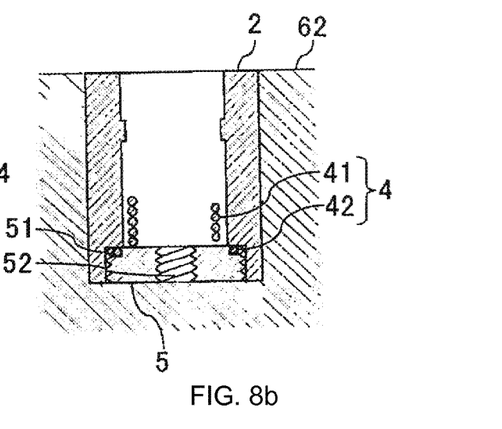
Figure 8C:
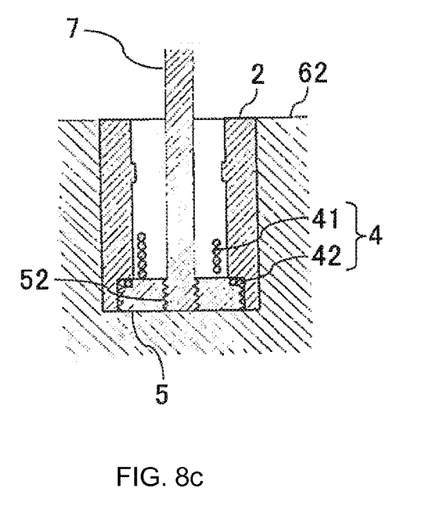
Figure 8D:
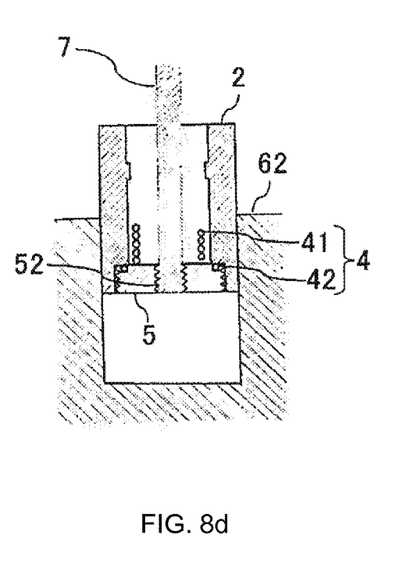

In the second embodiment, the cover body 5 has a substantially cylindrical shape in a plan view, and includes the female thread part 52 in the inner peripheral surface of the cylindrical shape (see FIG. 7).

A method for removing the marking device 1 of the second embodiment will be described. The marking device 1 is arranged in the movable mold 62 of a mold (see FIG. 8(a)). First, the tip of a flat-blade screw driver is inserted in a place, where the arrow of the index part 33 of the index body 3 is marked (see FIG. 4), to rotate the index body 3 and remove it from the marking device 1 (see FIG. 8(b)). Next, a rod-shaped tool 7 (driver etc.) having a male thread part at its tip is threadedly engaged with the female thread part 52 of the cover body 5 to insert the tool into the marking device (see FIG. 8(c)). As a result, the tool and the outer shell body for indication 2 are integrated, and the marking device 1 is pulled out from the movable mold 62 by pulling the tool 7 (see FIG. 8(d)).

In this manner, even if a hammer cannot be used for removing the marking device 1 from a mold for a structural reason of the mold, the tool 7 having a male thread part such as driver is threadedly engaged with the female thread part 52 and pulled out, so that the marking device 1 can be easily removed from the mold, thereby improving, the efficiency of maintenance work.

Figure 9:
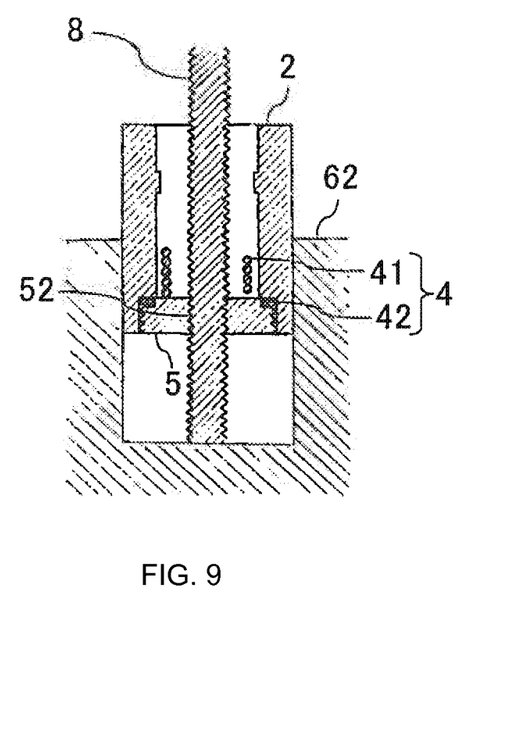
FIG. 9 shows that the marking device is being removed from the mold.

Further, as shown in FIG. 9, when a tool 8 having a male thread part formed on its driver shaft is used, the male thread part of the tool 8 is threadedly engaged with the female thread part of the inner peripheral surface of the cover body 5, and then the tool 8 is kept rotating while the tip surface of the tool 8 and the bottom part oldie hole in which the marking device is received are in contact with each other, so that the marking device 1 is lifted in the hole to remove the marking device 1 from the mold.

The marking device 1 of the second embodiment is not limited to the structure in which the spring 4 is engaged with the index body 3 (see FIG. 7), but it includes, for example, a structure in which the index body 3 is threadedly engaged with a nut and a cover body is arranged below the nut (see FIG. 9). In other words, the marking device 1 in the second embodiment is characterized by a structure in which the female thread part 52 is provided in the cover body 5 arranged at the lowermost part of the outer shell body for indication 2.

In the present embodiment, the marking device having one projecting part for positioning 36 and the same number of projecting parts for positioning 36 as the positioning grooves 221 has been described; however, the present invention is not limited to this. As described in Japanese Patent Publication No. 4002556 by the present applicant who is a patentee of this patent, when a plurality of projecting parts for positioning 36 is provided, and at least one of the projecting parts for positioning 36 is fit into a positioning groove 221, it is possible to make a structure such that other projecting parts for positioning are in contact with the inner will surface of the outer shell body for indication between positioning grooves.

The present invention is suitably used as an in-mold detachable marking device detachably mounted in a mold for molding a product.

PARTS LIST

1 In-mold detachable marking device
2 Outer shell body for indication
21 Upper part
22 Middle part
23 Lower part
3 Index body
31 Shaft
311 Threaded part
32 Positioning part
33 Index part
36 Projecting part for positioning
363 Positioning spring
364 Fitting part
4 Spring
41 Engaging part
42 Fixed part
5 Cover body
51 Groove portion
52 Female thread part

What is claimed is:
1. An in-mold detachable marking device comprising:
a substantially cylindrical outer shell body for indication fit into a molding mold,
an index body fit into said outer shell body for indication and configured to be angularly displaceable around the axis line of said outer shell body for indication, a cover body screwed at a lowermost part of said outer shell body for indication, and a spring which biases said index body with the downward force, said outer shell body for indication and said index body having a marking indication part formed on their surfaces, wherein said index body comprises an index part facing inner surface of said mold, a positioning part extending downward from said index part, and a shaft extending downward from said positioning part, said shaft having a threaded part in its lower part, said spring has an engaging part which engages with said threaded part of the index body, and a fixed part which is fixed to said cover body, pitch of said spring of said engaging part and pitch of said threaded part are equal, and said engaging part and said threaded part engage each other wherein a groove portion is formed on the cover body, said groove portion comprising an annular part and a linear part;

wherein the fixed part is located at a lower part of the spring, and the fixed part has an annular part and a linear part; said annular part being arranged in the annular part of the groove portion of the cover body, and said linear part being arranged in the linear part of the groove portion of the cover body.

2. The in-mold detachable marking device according to claim 1, wherein said marking device comprises an inner wall of said outer shell body for indication, an upper part receiving said index part, a middle part located below said upper part, where said positioning part is located in the middle part, and a lower part located below said middle part and receiving said shaft, said lowermost part of said outer shell body for indication is located below said lower part of the outer shell body and has a larger diameter than said lower part, and comprises a female thread part to be screwed with said cover body, and said top surface of said cover body and said lower part of said outer shell body for indication come into contact.

3. The in-mold detachable marking device according to claim 1, wherein at said positioning part of said index body, a projecting part for positioning which projects in a radial direction of said positioning part is provided, said projecting part for positioning comprising a positioning spring embedded in said positioning part and a fitting part placed at a tip of said positioning spring, said projecting part for positioning is fit into said middle part of inner wall surface of said outer shell body for indication and positioning grooves extending in an axial direction of said outer shell body for indication are formed continuously and at equal intervals along a circumferential direction of said outer shell body for indication.

4. The in-mold detachable marking device according to claim 1, said cover body is in a substantially cylindrical shape in a planar view and has a female thread part on the peripheral surface of said cylinder.

5. The in-mold detachable marking device according to claim 2, where said fixed portion of the spring is held in place in the annular part and the linear part of the groove portion of the cover body when the cover body is screwed into the female threaded part of the outer shell body, and said top surface of said cover body and said lower part of said outer shell body for indication come into contact.

* * * * *